UNITED STATES PATENT OFFICE.

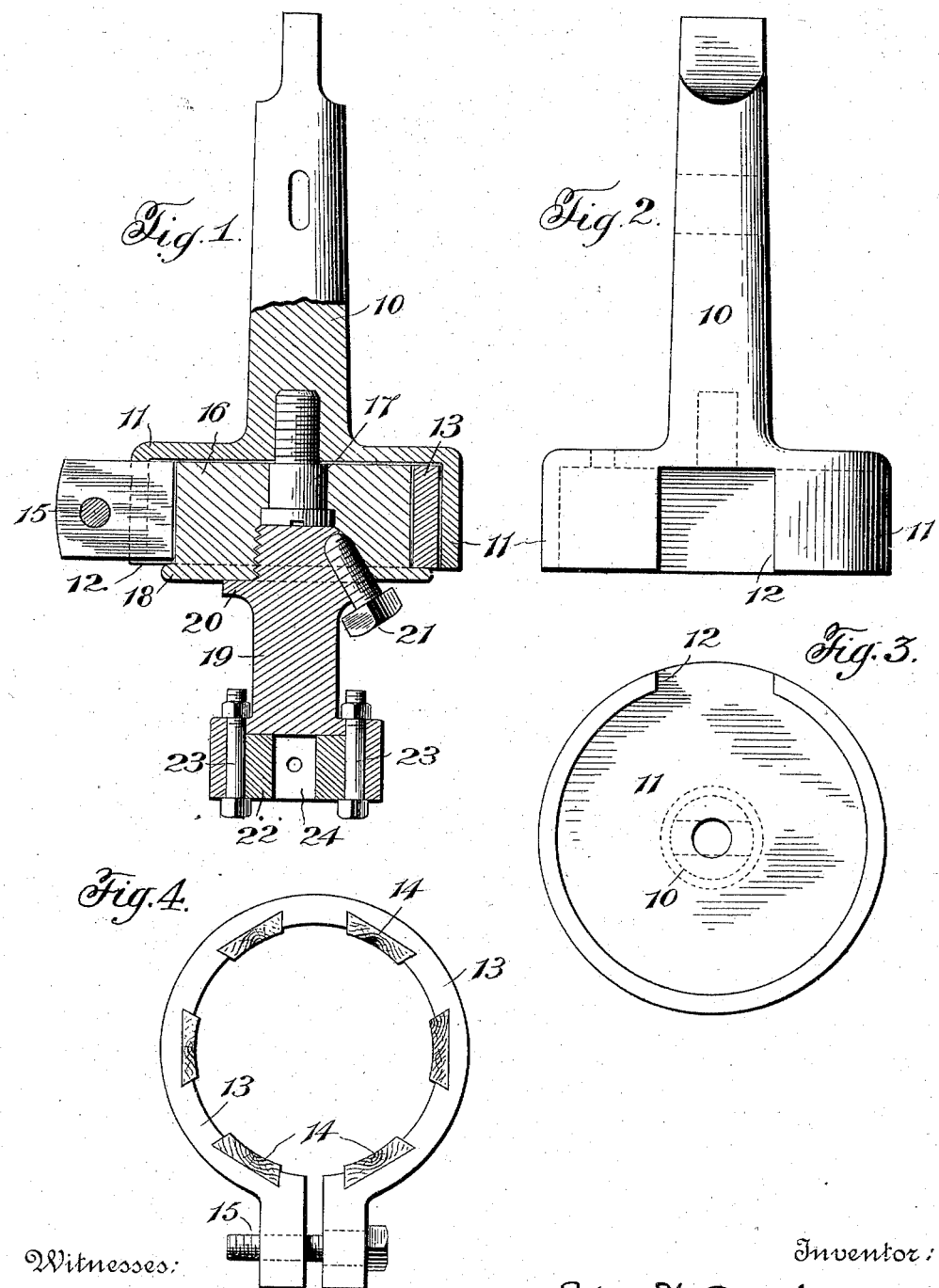

HENRY W. JACOBS, OF TOPEKA, KANSAS.

FRICTION SCREW-DRIVER.

966,835.     Specification of Letters Patent.     Patented Aug. 9, 1910.

Application filed May 9, 1908. Serial No. 431,993.

*To all whom it may concern:*

Be it known that I, HENRY W. JACOBS, of Topeka, in the county of Shawnee and State of Kansas, have invented a certain new and useful Friction Screw-Driver, and do hereby declare that the following is a full and exact description thereof.

The object of my invention has been to provide a screw driving device, which can be driven by power and yet which will yield, when the screw has been driven home, without necessitating the stoppage of the power; and to such ends my invention consists in the screw driving device hereinafter specified.

Referring to the accompanying drawings, Figure 1 is a vertical sectional view of a screw driving device embodying my invention; Figs. 2 and 3 are respectively a side elevation and a bottom plan view of the socket; and Fig. 4 is a plan view of the friction sleeve.

In that embodiment of my invention which I have chosen for illustration, I provide a shank 10, or other form of attachment to a casing, containing a shaft that is rotated by power, although my invention is adapted for use with an ordinary bit and bit stock or other hand-driven appliance. On the lower end of the shank 10, a socket 11 is formed, said socket being cut away at 12. Within the socket is a strap 13, annular in form, and having dove-tailed into its inner surface friction blocks 14. The ends of the strap project through the slot 12, and are adapted to be drawn together by a screw 15. Within the strap is a friction head 16 that is journaled as on a screw 17 that is screwed into the shank. A flange 18 is preferably formed on the lower edge of the friction head to underlie the strap and keep the strap in place in the socket. Obviously, however, some projection could be formed on the socket to engage the under surface of the strap or a groove in its periphery to hold the strap in place. Some means of engaging the device to be driven with the friction head must be provided. In the instance chosen for illustration, I provide a holder consisting of a stem 19 that is threaded into a central hole in the friction head, a shoulder 20 formed on the stem contacting with the lower surface of the friction head. A screw 21 is threaded partly into the shank 19 and partly into the friction head to hold the two together and prevent rotation relative to each other. In order that one shank may be used for driving a variety of devices, I fasten on its lower end a plate 22 by screws 23 passing through the said plate and through a flange on the lower end of the shank. In the plate 22 is a socket 24 by which a screw-driver tap, or other device to be driven, may be fastened. The particular embodiment illustrated is intended for driving screw railroad spikes.

In the operation of my device, the shank 10, socket and friction strap are constantly rotated by power. The screw 15 is adjusted so that the friction produced by the blocks 14 upon the friction head is sufficient to rotate said head against the ordinary resistance of screwing the spike home, but is small enough so that it will yield when the head of the spike strikes the face of the rail. The screw-driver being engaged with the spike, the spike is screwed down into the tie until its head strikes the rail, when the friction head will slip in the strap. The operative can then withdraw the device from engagement with the spike without shutting off the power.

It is obvious that various changes can be made in the above illustrated embodiment of my invention, and I desire that my claims be not limited beyond the requirements of the prior art and their necessary intendment.

I claim:

1. A screw driving device comprising a shank, a socket, a friction band mounted in said socket, said band having ends projecting through a slot in said socket, a screw adapted to draw the ends of said bands together, a friction head within said socket, a flanged screw engaging a seat in said head and threaded into said socket for securing said head in said socket and a shank threaded into said head over the flanged screw.

2. A screw driving device, comprising a socket, a friction band mounted in said socket, said band having ends projecting through a slot in said socket, means adapted to draw the ends of said band together, a friction head within said socket, a flanged screw engaging a seat in said head and threaded into said socket for securing said head in said socket, and a screw engaging device carried by said head.

In testimony that I claim the foregoing I have hereunto set my hand.

HENRY W. JACOBS.

Witnesses:
M. L. RHOADES,
W. M. ALLISON, Jr.